United States Patent
Tang et al.

(10) Patent No.: US 10,339,177 B2
(45) Date of Patent: Jul. 2, 2019

(54) METHOD AND A SYSTEM FOR VERIFYING FACIAL DATA

(71) Applicant: Huawei Technologies Co., Ltd., Shenzhen (CN)

(72) Inventors: Xiaoou Tang, Hong Kong (HK); Chaochao Lu, Hong Kong (HK)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/278,461

(22) Filed: Sep. 28, 2016

(65) Prior Publication Data

US 2017/0031953 A1   Feb. 2, 2017

Related U.S. Application Data

(63) Continuation of application No. PCT/CN2014/000350, filed on Mar. 28, 2014.

(51) Int. Cl.
*G06F 16/50* (2019.01)
*G06F 16/583* (2019.01)
(Continued)

(52) U.S. Cl.
CPC ..... *G06F 16/5838* (2019.01); *G06K 9/00288* (2013.01); *G06K 9/629* (2013.01); *G06K 9/6232* (2013.01); *G06N 7/005* (2013.01); *G06N 20/00* (2019.01); *G06K 9/6218* (2013.01)

(58) Field of Classification Search
CPC .......... G06F 17/30256; G06F 16/5838; G06N 20/00; G06K 9/00288; G06K 9/629; G06K 9/6232; G06K 9/6218
See application file for complete search history.

(56) References Cited

U.S. PATENT DOCUMENTS

| | | |
|---|---|---|
| 2003/0195777 A1 | 10/2003 | Greenstein et al. |
| 2011/0013845 A1* | 1/2011 | Tu ..................... G06K 9/00288 382/218 |

(Continued)

FOREIGN PATENT DOCUMENTS

| | | |
|---|---|---|
| CN | 1701339 A | 11/2005 |
| CN | 101145261 A | 3/2008 |

(Continued)

OTHER PUBLICATIONS

Kian Ming Adam Chai, Multi-task Learning with Gaussian Processes, PhD dissertation, University of Edinburgh, 2010 [retrieved Feb. 8, 2017]. Retrieved from the Internet: https://www.era.lib.ed.ac.uk/bitstream/handle/1842/3847/Chai2010.pdf.*

(Continued)

*Primary Examiner* — Kristopher Andersen
(74) *Attorney, Agent, or Firm* — Conley Rose, P.C.

(57) ABSTRACT

A method for verifying facial data and a corresponding system, which comprises retrieving a plurality of source-domain datasets from a first database and a target-domain dataset from a second database different from the first database; determining a latent subspace matching with target-domain dataset best and a posterior distribution for the determined latent subspace from the target-domain dataset and the source-domain datasets; determining information shared between the target-domain data and the source-domain datasets; and establishing a Multi-Task learning model from the posterior distribution P and the shared information M on the target-domain dataset and the source-domain datasets.

20 Claims, 4 Drawing Sheets

(51) Int. Cl.
*G06N 7/00* (2006.01)
*G06K 9/00* (2006.01)
*G06K 9/62* (2006.01)
*G06N 20/00* (2019.01)

(56) References Cited

U.S. PATENT DOCUMENTS

2011/0035346 A1 2/2011 Melkumyan et al.
2013/0325782 A1 12/2013 Fujimaki et al.

FOREIGN PATENT DOCUMENTS

| CN | 101174298 A | 5/2008 |
| CN | 102663779 A | 9/2012 |
| WO | 2004027692 A1 | 4/2004 |

OTHER PUBLICATIONS

Raquel Urtasun and Trevor Darrell, Discriminative Gaussian Process Latent Variable Model for Classification, Proceeding of the 24th International Conference on Machine Learning, 2007 [retrieved Feb. 10, 2017]. Retrieved from the Internet: http://dl.acm.org/citation.cfm?id=1273613.*

Pingping Xiu and Henry S. Baird, Whole-Book Recognition using Mutual-Entropy-Driven Model Adaption, Proc. SPIE 6815, Document Recognition and Retrieval XV, 681506, 2008 [retrieved on Feb. 19, 2017]. Retrieved from the Internet: http://dx.doi.org/10.1117/12.767121.*

Foreign Communication From a Counterpart Application, PCT Application No. PCT/CN2014/000350, International Search Report dated Dec. 30, 2014, 2 pages.

Machine Translation and Abstract of Chinese Publication No. CN102663779, Sep. 12, 2012, 13 pages.

Foreign Communication From a Counterpart Application, Chinese Application No. 201480077293.1, Chinese Office Action dated Jan. 29, 2019, 4 pages.

Foreign Communication From a Counterpart Application, Chinese Application No. 201480077293.1, Chinese Search Report dated Jan. 8, 2019, 2 pages.

* cited by examiner

METHOD AND A SYSTEM FOR VERIFYING FACIAL DATA

CROSS-REFERENCE TO RELATED APPLICATIONS

This application is a continuation of International Application No. PCT/CN2014/000350, filed on Mar. 28, 2014, the disclosure of which is hereby incorporated by reference in its entirety.

TECHNICAL FIELD

The present application relates to a method for verifying facial data and a system thereof.

BACKGROUND

Face verification, which is a task of determining whether a pair of face images are from the same person, has been an active research topic in computer vision for decades. It has many important applications, including surveillance, access control, image retrieval, and automatic log-on for personal computer or mobile devices. However, various visual complications deteriorate the performance of face verification. This has been shown particularly by numerous studies on real-world face images from the wild.

Modern face verification methods are mainly divided into two categories: extracting low-level features, and building classification models. Although these existing methods have made great progress in face verification, most of them are less flexible when dealing with complex data distributions. For the methods in the first category, for example, low-level features are handcrafted. Even for features learned from data, the algorithm parameters (such as the depth of random projection tree, or the number of centers in k-means) also need to be specified by users. Similarly, for the methods in the second category, the architectures of neural networks (for example, the number of layers, the number of nodes in each layer, etc.), and the parameters of the models (for example, the number of Gaussians, the number of classifiers, etc.) must also be determined in advance. Since most existing methods require some assumptions to be made about the structures of the data, they cannot work well when the assumptions are not valid. Moreover, due to the existence of the assumptions, it is hard to capture the intrinsic structures of data using these methods.

Most existing face verification methods are suitable for handling verification tasks under the underlying assumption that the training data and the test data are drawn from the same feature space and follow the same distribution. When the distribution changes, these methods may suffer a large performance drop. However, many practical scenarios involve cross-domain data drawn from different facial appearance distributions. It is difficult to recollect the necessary training data and rebuild the models in new scenarios. Moreover, there is usually not enough training data in a specified target domain to train a sufficiently good model for high-accuracy face verification, due to the fact the weak diversity of source data often leads to over-fitting. In such cases, it becomes especially important to exploit more data from multiple source-domains to improve the performance of face verification methods in the target-domain.

SUMMARY

To address these issues, the present application proposes a Multi-Task Learning approach based on Discriminative Gaussian Process Latent Variable Model (MTL-DGPLVM) for face verification. The MTL-DGPLVM model is based on Gaussian Processes (GPs) that is a non-parametric Bayesian kernel method.

The present application uses GPs method mainly due to at least one of the following three notable advantages. Firstly, it is a non-parametric method, which means it is flexible and can cover complex data distributions in the real world. Secondly, GPs method can be computed effectively because its marginal probability is a closed-form expression. Furthermore, its hyper-parameters can be learned from data automatically without using model selection methods such as cross validation, thereby avoiding the high computational cost. Thirdly, the inference of GPs is based on Bayesian rules, resulting in the robustness to over-fitting.

According to one embodiment of the present application, the discriminative information constraint is used to enhance the discriminability of GPs. Considering that GPs depend on the covariance function, it is logical to adopt Kernel Fisher Discriminant Analysis (KFDA) as the discriminative regularizer. In order to take advantage of more data from multiple source-domains to improve the performance in the target-domain, the present application also introduces the multi-task learning constraint to GPs. Here, it investigates the asymmetric multi-task learning because the present application only focuses on the performance improvement of the target task. From the perspective of information theory, this constraint is to maximize the mutual information between the distributions of target-domain data and multiple source-domains data. The MLT-DGPLVM model can be optimized effectively using the gradient descent method.

The proposed MLT-DGPLVM model can be applied to face verification in two different ways: as a binary classifier and as a feature extractor. For the first way, given a pair of face images, it directly computes the posterior likelihood for each class to make a prediction. In the second way, it automatically extracts high-dimensional features for each pair of face images, and then feeds them to a classifier to make the final decision.

In one aspect, there is disclosed a method for verifying facial data, comprising a step of retrieving a plurality of source-domain datasets from a first database and a target-domain dataset from a second database different from the first database, a step of determining a latent subspace matching with target-domain dataset best, and a posterior distribution for the determined latent subspace from the target-domain dataset and the source-domain datasets; a step of determining information shared between the target-domain data and the source-domain datasets; and a step of establishing a Multi-Task learning model from the posterior distribution P, and the shared information M on the target-domain dataset and the source-domain datasets.

In another aspect of the present application, there is disclosed an apparatus for verifying facial data, comprising a model establishing module, wherein the model establishing module comprises a retrieve unit configured to retrieve a plurality of source-domain datasets from a first database and a target-domain dataset from a second database different from the first database and a model establisher configured to determine a latent subspace matching with target-domain dataset best, and a posterior distribution for the determined latent subspace from the target-domain dataset and the source-domain datasets; determine information shared between the target-domain data and the source-domain datasets; and establish a Multi-Task learning model from the posterior distribution, and the shared information on the target-domain dataset and the source-domain datasets.

In further aspect of the present application, the application further proposes system for verifying facial data, comprising:

means for retrieving a plurality of source-domain datasets from a first database and a target-domain dataset from a second database different from the first database;

means for determining a latent subspace matching with target-domain dataset best, and a posterior distribution for the determined latent subspace from the target-domain dataset and the source-domain datasets;

means for determining information shared between the target-domain data and the source-domain datasets; and means for establishing a Multi-Task learning model from the posterior distribution, and the shared information on the target-domain dataset and the source-domain datasets.

BRIEF DESCRIPTION OF THE DRAWING

Exemplary non-limiting embodiments of the present disclosure are described below with reference to the attached drawings. The drawings are illustrative and generally not to an exact scale. The same or similar elements on different figures are referenced with the same reference numbers.

DETAILED DESCRIPTION

Figure 1:
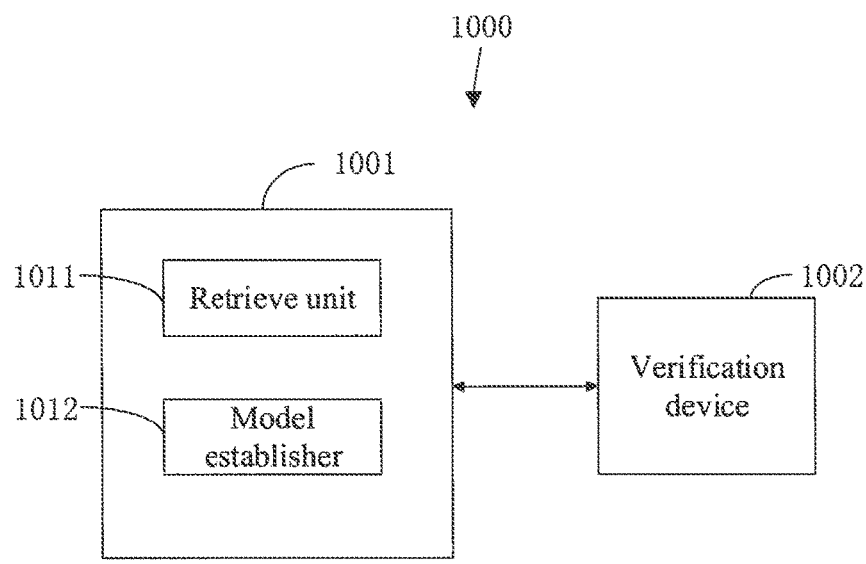
FIG. 1 is a schematic diagram illustrating an apparatus for verifying facial data consistent with some disclosed embodiments.

Reference will now be made in detail to exemplary embodiments, examples of which are illustrated in the accompanying drawings. When appropriate, the same reference numbers are used throughout the drawings to refer to the same or like parts. FIG. 1 is a schematic diagram illustrating an exemplary apparatus 1000 for verifying facial data consistent with some disclosed embodiments.

It shall be appreciated that the apparatus 1000 may be implemented using certain hardware, software, or a combination thereof. In addition, the embodiments of the present disclosure may be adapted to a computer program product embodied on one or more computer readable storage media (comprising but not limited to disk storage, compact disc read only memory (CD-ROM), optical memory and the like) containing computer program codes.

Figure 2:
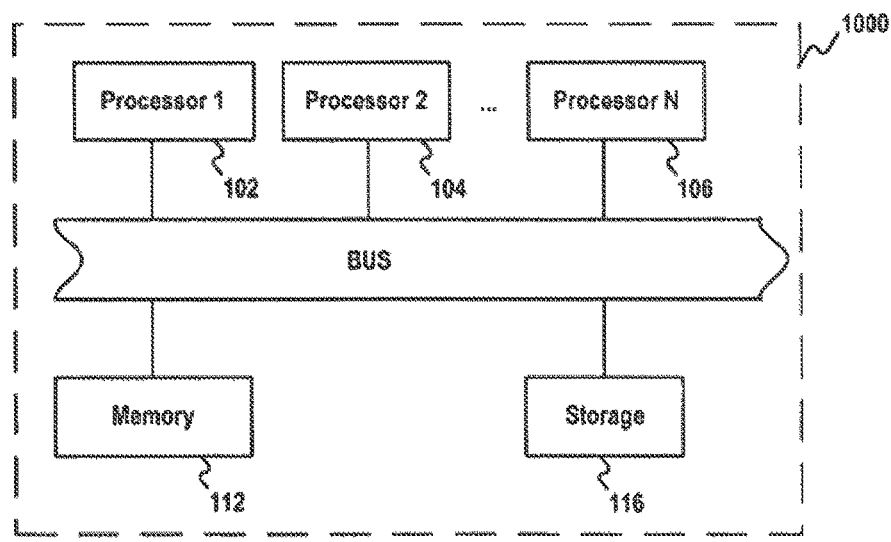
FIG. 2 is a schematic diagram illustrating an apparatus for verifying facial data when it is implemented in software, consistent with some disclosed embodiments.

In the case that the apparatus 1000 is implemented with software, the apparatus 1000 may include a general purpose computer, a computer cluster, a mainstream computer, a computing device dedicated for providing online contents, or a computer network comprising a group of computers operating in a centralized or distributed fashion. As shown in FIG. 2, the apparatus 1000 may include one or more processors (processors 102, 104, 106 etc.), a memory 112, a storage device 116, a communication interface, and a bus to facilitate information exchange among various components of apparatus 1000. Processors 102-106 may include a central processing unit (CPU), a graphic processing unit (GPU), or other suitable information processing devices. Depending on the type of hardware being used, processors 102-106 can include one or more printed circuit boards, and/or one or more microprocessor chips. Processors 102-106 can execute sequences of computer program instructions to perform various methods that will be explained in greater detail below.

Memory 112 can include, among other things, a random access memory (RAM) and a read-only memory (ROM). Computer program instructions can be stored, accessed, and read from memory 112 for execution by one or more of processors 102-106. For example, memory 112 may store one or more software applications. Further, memory 112 may store an entire software application or only a part of a software application that is executable by one or more of processors 102-106. It is noted that although only one block is shown in FIG. 1, memory 112 may include multiple physical devices installed on a central computing device or on different computing devices.

Referring to FIG. 1 again, where the apparatus 1000 is implemented by the hardware, it may comprise a device 1001 for establishing a Multi-Task learning model of facial data. The device 1001 comprises a retrieve unit 1011 configured to retrieve a plurality of source-domain datasets $X_i$ from a first database and a target-domain dataset $X_t$ from a second database different from the first database. In the prior art, most existing face verification methods are suitable for handling verification tasks under the underlying assumption that the training data and the test data are drawn from the same feature space and follow the same distribution. When the distribution changes, these methods may suffer a large performance drop. However, many practical scenarios involve cross-domain data drawn from different facial appearance distributions. It is difficult to recollect the necessary training data and rebuild the models in new scenarios. Moreover, there is usually not enough training data in a specified target domain to train a sufficiently good model for high-accuracy face verification, due to the fact the weak diversity of source data often leads to over-fitting. In such cases, it becomes especially important to exploit more data from multiple source-domains to improve the performance of face verification methods in the target-domain. Accordingly, besides the target-domain dataset as used in the prior art, the present application unitize at least four source-domain datasets. For example, for each one of the four source-domain datasets, the training set consisting of around 20,000 (for example) pairs of matched images and around 20,000 (for example) pairs of mismatched images may be collected.

In one embodiment of the present application, the source-domain datasets may include different types of datasets, which may comprises (for example):

Web Images This dataset contains around 40,000 facial images from 3261 subjects; that is, approximately 10 images for each person. The images were collected from the Web with significant variations in pose, expression, and illumination conditions.

Multi-PIE. This dataset contains face images from 337 subjects under 15 view points and 19 illumination conditions in four recording sessions. These images are collected under controlled conditions.

YouTube® Faces This dataset contains 3425 videos of 1595 different subjects in the unconstrained environment. All the videos were downloaded from YouTube. Each subject has a large-scale collection of labeled images with low-resolution.

LifePhotos$^{red2}$® This dataset contains approximately 5000 images of 400 subjects collected online. Each subject has roughly 10 images.

The target-domain dataset may comprise, for example, the benchmark of face verification (Faces in the Wild, (LFW)) as disclosed in the prior art. This dataset contains 13,233 uncontrolled face images of 5749 public figures with variety of ethnicity, gender, age, etc. All of these images are collected from the Web. In the present application, the LFW dataset may be used as the target-domain dataset because it is a challenging benchmark compared with other existing face verification methods.

The device 101 further comprises a model establisher 1012 configured to establish a Multi-Task learning model of facial data based on the source-domain datasets $X_i$ database and the target-domain dataset $X_t$ retrieved by the retrieve unit 1011. In particular, the model establisher 1012 is configured to determine a latent subspace Z matching with target-domain dataset $X_t$ best, and a posterior distribution P for the target-domain dataset $X_t$ from the determined latent subspace Z and the source-domain datasets $X_i$. The model establisher 1012 is configured to further determine information NI shared between the target-domain data $X_t$ and the source-domain datasets $X_i$, and then establish a Multi-Task learning model $L_{model}$ from the posterior distribution P, the shared information H and the target-domain dataset $X_t$, which will be discussed for details in reference to the process as disclosed in another aspect of the present application later.

As shown in FIG. 1, the apparatus 1000 may further comprise a verification device 1002. The verification device 1002 is configured to obtain a first plurality of multiple scale features $m_1, m_2, \ldots m_p$ from a first face A and a second plurality of multiple scale features $n_1, n_2 \ldots n_p$ from a second person B in the different landmarks of two faces of A and B. Then, the similarities $S_1, S_2, \ldots S_p$ of each two features in the same landmarks are computed in the conventional means. That is, $S_1$ refers to the similarity of $m_1$ and $n_1$, S2 refers to the similarity of $m_2$ and $n_2, \ldots$ and $S_p$ refers to the similarity of $m_p$ and $n_p$. The $S_1, S_2, \ldots S_p$ are formed as input vector X to the Multi-Task learning model to determine whether the first and the second multiple scale features are from the same individual, which will be discussed in details later.

Figure 3:
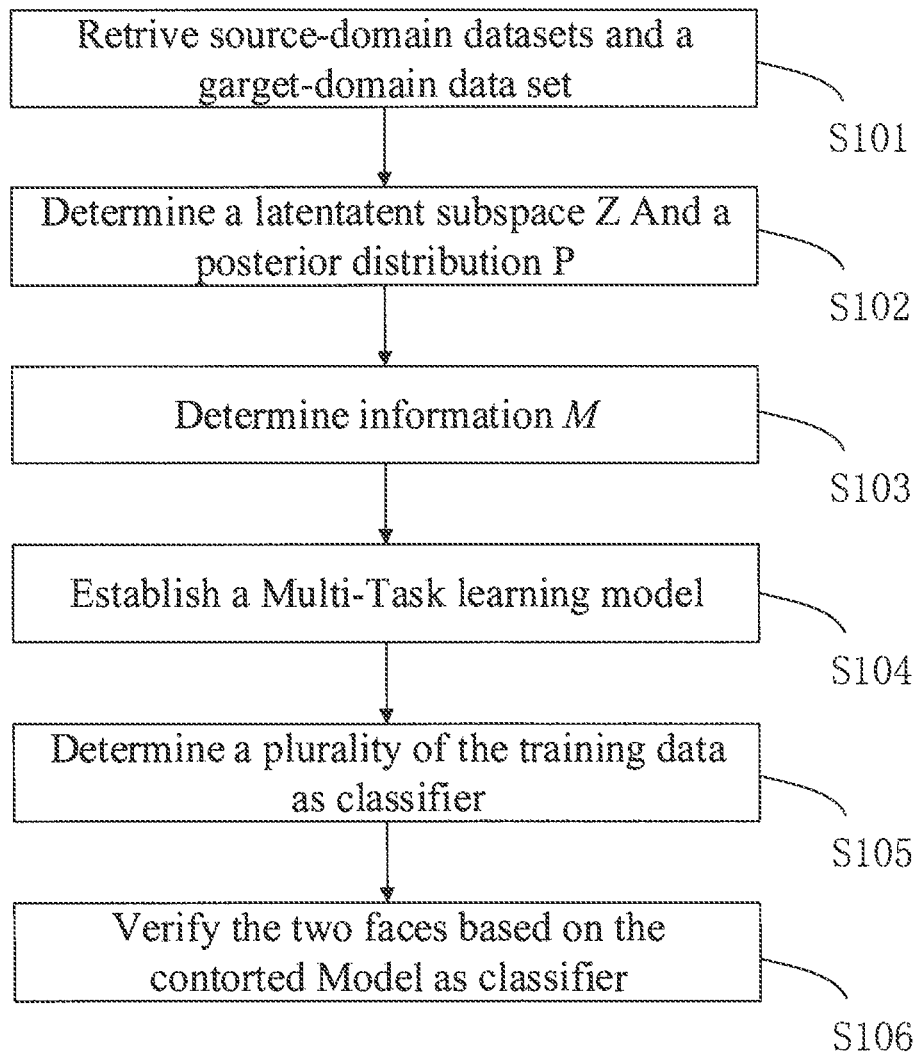
FIG. 3 is a schematic diagram illustrating a method for verifying facial data, consistent with a first disclosed embodiment.

FIG. 3 shows a flowchart illustrating a method for verifying facial data consistent with some disclosed embodiments. In FIG. 3, process 100 comprises a series of steps that may be performed by one or more of processors 102-106 or each module/unit of the apparatus 1000 to implement a data processing operation. For purpose of description, the following discussion is made in reference to the situation where each module/unit of the apparatus 1000 is made in hardware or the combination of hardware and software.

At step S101, the apparatus 1000 operates to retrieve a plurality of source-domain datasets $X_1, X_2 \ldots X_s$ from a first database and a target-domain dataset $X_t$ from a second database by the retrieve unit 1011. For example, the source-domain datasets include different types of datasets, which have been discussed in the above.

At step S102, the apparatus 1000 operates to determine a latent subspace Z for, which matches with $X_t$ best, based on a conventional Gaussian Process Latent Variable Model (GPLVM) by the model establisher 1012. And then, in this step, it determines a posterior distribution P for the target data $X_t$ from the latent subspace Z, source-domain datasets $X_i$, which is discussed in detailed as below.

To be specific, let $Z=[z_1, \ldots z_N]^T$ denote the matrix whose rows represent corresponding positions of X in latent space, where $z_i \in R^d (d \ll D)$. The GPLVM can be interpreted as a Gaussian process mapping from a low dimensional latent space to a high dimensional data set, where the locale of the points in latent space is determined by maximizing the Gaussian process likelihood with respect to Z. Given a covariance function for the Gaussian process, denoted by k(.,.), the likelihood of the data given the latent positions is as follows, $$p(X \mid Z, \theta) = \frac{1}{\sqrt{(2\pi)^{ND}|K|^D}} \exp\left(-\frac{1}{2}\text{tr}(K^{-1}XX^T)\right), \quad (1)$$

where $K_{i,j}=k(z_i, z_j)$. Therefore, the posterior P can be written as $$p(Z, \theta \mid X) = \frac{1}{Z_a} p(X \mid Z, \theta) p(Z) p(\theta), \quad (2)$$

where $Z_a$ is a normalization constant, the uninformative priors over $\theta$, and the simple spherical Gaussian priors over Z are introduced in the art and thus the detailed description is omitted herein. To obtain the optimal $\theta$ and Z, it needs to optimize the above likelihood with respect to $\theta$ and Z, respectively. In other words, given the data X, this formula describes the posterior of the data Z and the hyper-parameters $\theta$, which means that the latent positions Z and the hyper-parameters $\theta$ match with the data X best.

At step S103, the model establisher 1012 determines information M shared between the target data $X_i$ and the source data $X_i$ by extending a mutual entropy to the posterior distributions P obtained in step S102.

From an asymmetric multi-task learning perspective, the tasks should be allowed to share common hyper-parameters of the covariance function. Moreover, from an information theory perspective, the information cost between target task and multiple source tasks should be minimized. A natural way to quantify the information cost is to use the mutual entropy, because it is the measure of the mutual dependence of two distributions. For multi-task learning, we extend the mutual entropy to multiple distributions as follows:

$$M = H(p_t) - \frac{1}{S} \sum_{i=1}^{S} H(p_t \mid p_i), \quad (3)$$

where H(.) is the marginal entropy, H(.|.) is the conditional entropy, S is the number of source tasks, $\{p_i\}_{i=1}^{S}$, and $p_t$ are the probability distributions of source tasks and target task, respectively.

$p_t$ may be formulized as $$p(Z) = \frac{1}{Z_b} \exp\left(-\frac{1}{\sigma^2} J^*\right), \quad (4)$$

where $Z_b$ is a normalization constant, and $\sigma^2$ represents a global scaling of the prior.

At step S104, the model establisher 1012 is configured to establish a Multi-Task learning model $L_{Model}$ from posterior distribution P, the shared information M and target-domain dataset $X_t$ by rule of $$L_{model} = -\log p(Z_T, \theta \mid X_T) - \beta M, \quad (5)$$

where the parameter β is preset to balance the relative importance between the target-domain data $X_t$ and the multi-task learning constraint M (i.e. the shared information).

P represents a posterior distribution for the target data $X_t$ as set forth in formula (2);

$Z_t$ represents the latent subspace for $X_t$, which matches with $X_t$ best, as discussed in step S102;

M represents information shared between the target data $X_t$ and the source data Xi by extending a mutual entropy to multiple distributions P as discussed in formula (3).

The Multi-task learning model consists of two terms: $p(Z_T, θ|X_T)$ and M. The first item is to seek the optimal hyper-parameters and latent subspace in the given target-domain dataset. So $p(Z_T, θ|X_T)$ should be maximized, which means that the latent positions $Z_T$ and the hyper-parameters θ matching with the data $X_T$ best should be obtained. For simplicity, maximizing $p(Z_T, θ|X_T)$ is equivalent to maximizing $\log p(Z_T, θ|X_T)$. The second term is the multi-task learning constraint, which describes how much information is shared between the target-domain dataset and the source-domain datasets in the latent subspaces. Therefore, the second item should be also maximized. For convenience, the maximization of the two terms is equivalent to the minimization of the negative form of the two terms.

If taking formula (2) into (3), it then obtains $$M = H(p(Z_T, θ | X_T)) - \frac{1}{S}\sum_{i=1}^{S} H(p(Z_T, θ | X_T) | p(Z_i, θ | X_i)). \quad (6)$$

where H(.) is the marginal entropy, H(.|.) is the conditional entropy, S is the number of source-domain datasets, $\{p(z_i)\}_{i=1}^{S}$, and $p(Z_T)$ are the prior distributions of source-domain datasets and target-domain dataset, respectively.

$$p(Z) = \frac{1}{Z_b}\exp\left(-\frac{1}{\sigma^2}J^*\right), \quad (7)$$

where $Z_b$ is a normalization constant, and $\sigma^2$ represents a global scaling of the prior.

$$J^* = \frac{1}{\lambda}(a^T Ka - a^T KA(\lambda I_n + AKA)^{-1}AKa), \quad (8)$$

where $$a = \left[\frac{1}{n_+}1_{N_+}^T, -\frac{1}{N_-}1_{N_-}^T\right]$$

$$A = \text{diag}\left(\frac{1}{\sqrt{N_+}}\left(I_{N_+} - \frac{1}{N_+}1_{N_+}1_{N_+}^T\right), \frac{1}{\sqrt{N_-}}\left(I_{N_-} - \frac{1}{N_-}1_{N_-}1_{N_-}^T\right)\right).$$

Here, $I_N$ denotes the N×N identity matrix and $1_N$ denotes the length-N vector of all ones in $R^N$.

Since face verification is a binary classification problem and the GPs mainly depend on the kernel function, it is natural to use KFDA to model class structures in kernel spaces. For simplicity of inference in the followings, we introduce another equivalent formulation of KFDA to replace the one in the prior art. KFDA is a kernelized version of linear discriminant analysis method. It finds the direction defined by a kernel in a feature space, onto which the projections of positive and negative classes are well separated by maximizing the ratio of the between-class variance to the within-class variance. Formally, let $\{z_1, \ldots, z_{N_+}\}$ denote the positive class and $\{z_{N_++1}, \ldots, z_N\}$ the negative class, where the numbers of positive and negative classes are $N_+$ and $N_-=N-N_+$, respectively. Let K be the kernel matrix. Therefore, in the feature space, the two sets $\{\phi_K(z_1), \ldots, \phi_K(N_{N_+})\}$ and $\{\phi_K(z_{N_++1}), \ldots, \phi_K(z_{N_++1}), \ldots, \phi_K(z_N)\}$ represent the positive class and the negative class, respectively.

From the above, in order to concrete form of (the parameters K) for the Multi-Task learning model, only one parameter K needed to be determined, which in turn depends on θ. At S104, the hyper-parameters $θ^0$ randomly initialized first, and then it applies the gradient descent method to the Multi-Task learning model as shown in formulation (5) by rule of $$\frac{\partial \mathcal{L}_{Model}}{\partial θ_j} = \left(β(\log P_T + 1) + \frac{β}{SP_T}\sum_{i=1}^{S} P_{T,i} - \frac{1}{P_T}\right)\frac{\partial P_T}{\partial θ_j} + \quad (9)$$

$$\frac{β}{S}\sum_{i=1}^{S}(\log P_T - \log P_{T,i} - 1)\frac{\partial P_{T,i}}{\partial θ_j}.$$

At then, an iteration process is it applied to $$\frac{\partial L_{model}}{\partial θ}$$

by rule of $$θ^t = θ^{t-1} - α\frac{\partial L_{model}}{\partial θ} \quad (10)$$

In the t-th iteration, we use all source-domain datasets $X_1, X_2, \ldots X_s$ and target-domain $X_t$ obtained above to obtain $θ^t$ using the gradient descent method according the Equation (9). By running the iteration many times, θ will converge to some optimal values θ*. The optimal θ* is used to determinate K by rule of $$K_{i,j} = k_θ(x_i, x_j) = θ_0 \exp\left(-\frac{1}{2}\sum_{m=1}^{d}θ_m(x_i^m - x_j^m)^2\right) + θ_{d+1} + \frac{δ_{x_i,x_j}}{θ_{d+2}}, \quad (11)$$

where $θ=\{θ_i\}_{i=0}^{d+2}$ and d is the dimension of the data point.

Once the K is determined, the Multi-Task learning model (based on Discriminative Gaussian Process Latent Variable Model) will be concreted.

At step S105, the apparatus 1000 operates to control the verification device 1002 to verify the two faces based on the contorted Model. Firstly, the apparatus 1000 operates to determine a plurality of the training data by running the retrieve unit 1011. Specifically, assuming that we have S source-domain datasets, and each dataset contains N matched pairs and N mismatched pairs, P multi-scale features are extracted from each image. Herein P multi-scale feature means the feature obtained from patches with different size in the facial image. As shown in FIG. 1, for each pair of face images, the similarity score is computed between one multi-scale feature of one image and it corresponding multi-scale feature of the other image. As each pair of face images have P pairs of multi-scale features, then a similarity vector of size P can be obtained for each pair of face images. The similarity vector is regarded as an input $x_i$. So each pair of face images can be converted to a similarity vector as an input in the above way. Therefore, for each source-domain dataset $x_i$, it consists of N positive inputs and N negative inputs.

Figure 5A:
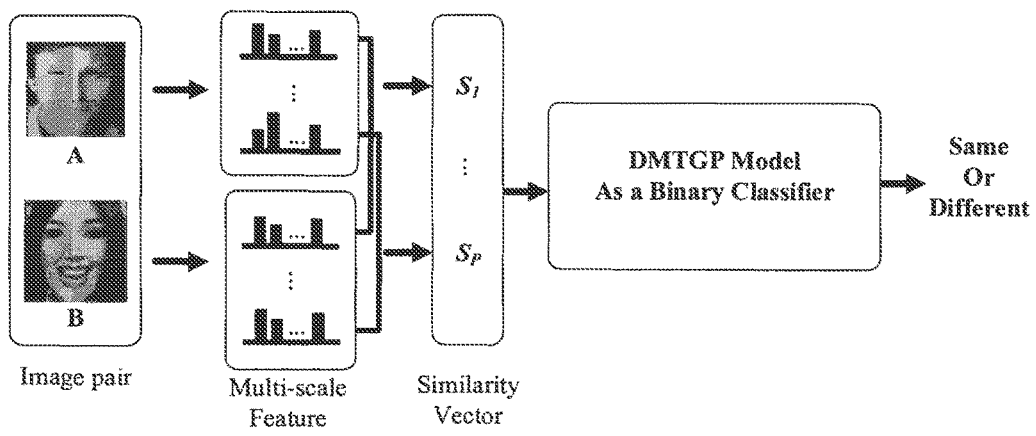
FIG. 5A and FIG. 5B are a schematic diagram illustrating a Scenario for the first and the second embodiments as shown in FIG. 3 and FIG. 4, respectively.

For example, as shown in FIG. 5A, a first plurality of multiple scale features $m_1, m_2, \ldots m_p$ from a first face A are obtained and a second plurality of multiple scale features $n_1, n_2 \ldots n_p$ from a second person B in the different landmarks of two faces of A and B. Then, the similarities $S_1, S_2, \ldots S_p$ of each two features in the same landmarks are computed in the conventional means. That is, $S_1$ refers to the similarity of $m_1$ and $n_1$, $S_2$ refers to the similarity of $m_2$ and $n_2, \ldots$ and $S_p$ refers to the similarity of $m_p$ and $n_p$. The $S_1, S_2, \ldots S_p$ formed as input vector x to the Multi-Task learning model to determine whether the first and the second multiple scale features are from the same individual by the following rules at step S106.

Given any unseen test point $x_*$ of X formed of $S_1, S_2, \ldots S_p$, the probability of its latent function $f_*$ is $$f_*|X,y,x_*:N(K_*K^{-1}\hat{f}, K_{**}-K_*\tilde{K}^{-1}K_*^T), \quad (11)$$

where $\tilde{K}=K+W^{-1}$.

That is, given the training data X, the labels of the training data y, and an un-seen test input $x_*$, its corresponding latent function $f_*$ should follow the multivariate Gaussian distribution with the mean $K_*K^{-1}\hat{f}$ and the covariance $K_{**}-K_*\tilde{K}^{-1}K_*^T$.

Finally, the present application squashes $f_*$ to find the probability of class membership as follows:

$$\bar{\pi}(f_*)=\int \pi(f_*)p(f_*|X,y,x_*)df_*.$$

In other words, given the training data X, the labels of the training data y, an un-seen test input $x_*$, and the distribution of its corresponding latent function $f_*$, we integrate all possibilities over the latent function $f_*$ of the an un-seen test input $x_*$ to predict its label. If the first and the second multiple scale features of the face pair are from the same individual, then it corresponding label $y_i=1$, otherwise, $y_i=-1$.

Figure 4:
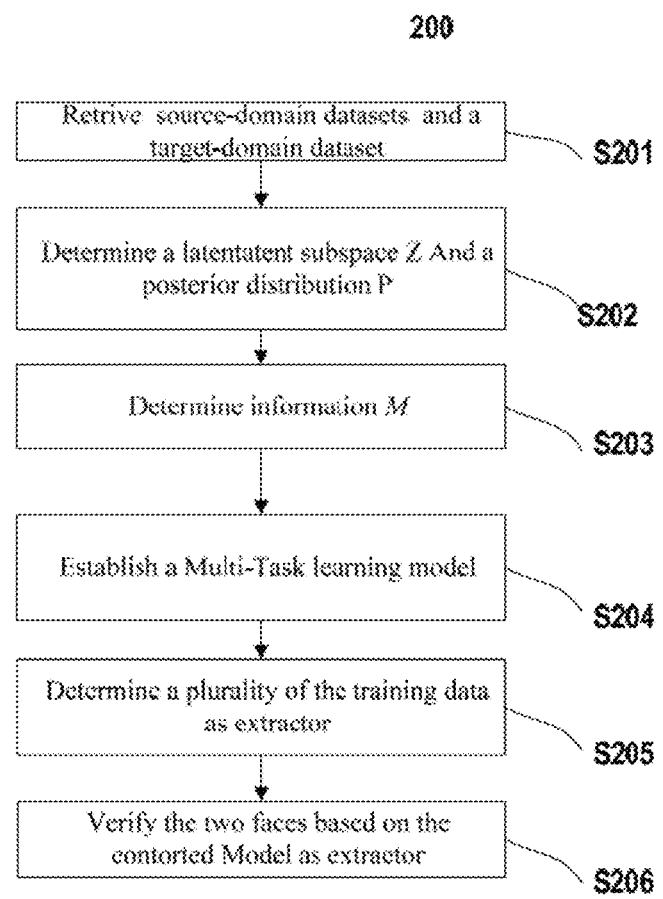
FIG. 4 is a schematic diagram illustrating a method for verifying facial data, consistent with a second disclosed embodiment.

Hereinafter, as shown in FIG. 4, a process 200 for verifying facial data consistent with anther embodiments of present application will be discussed. Similar to process 100, the process 200 also comprises a series of steps that may be performed by one or more of processors 102-106 of the apparatus 1000 to implement a data processing operation.

The process 200 comprises a step of S201 to retrieve a plurality of source-domain datasets Xi, X2 . . . Xs from a first database and a target-domain dataset Xt from a second database by running the retrieve unit 1011; a step of S202 of determining a latent subspace Z for, which compiles with Xt best, based on a conventional GPLVM by running the model establisher 1012. And then, in this step, it determines a posterior distribution P for the target data $X_t$ from the latent subspace Z, source-domain datasets $X_i$. In addition, the process 200 further comprises a step of S203 to determine information M shared between the target data $X_t$ and the source data $X_i$ by extending a mutual entropy to the posterior distributions P obtained in step S202; and a step of S204 to apply the gradient descent method to the Multi-Task learning model.

The step of S201~S204 are the same as the step of S101~S104, and thus the detailed description thereof omitted.

Figure 5B:
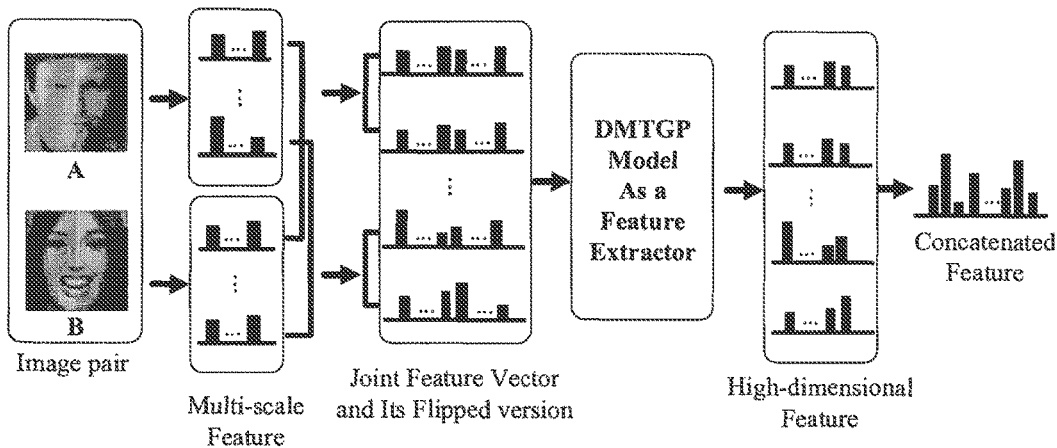

And then, in step S205, it determines the inputs for the proposed model (MTL-DGPLVM). Specifically, assuming that we have S source-domain datasets, and each dataset contains N matched pairs and N mismatched pairs, P multi-scale features are extracted from each image. Herein P multi-scale features refer to the features obtained from patches with different size in the facial image. Each pair of multi-scale features and its flipped version are then concatenated as shown in FIG. 5B, which is discussed below.

Suppose that the length of each multi-scale feature is L, then each pair of face images can generate 2P multi-scale features of size 2L. If the pair is from the same individual, then the corresponding label of each multi-scale feature of size 2L is $y_i=1$, otherwise, $y_i=-1$. Therefore, for each source-domain dataset $X_i$, it consists of 2PN positive inputs and 2PN negative inputs. For example, as shown in FIG. 5B, a first plurality of multiple scale features $m_1, m_2, \ldots m_p$ from a first face A are obtained and a second plurality of multiple scale features $n_1, n_2 \ldots n_p$ from a second person B in the different landmarks of two faces of A and B. And then each pair of multi-scale features and its flipped version are concatenated to obtain $[m_1, n_1]$ and $[n_1, m_1]$. Therefore, for each face pair, it generates 2P multi-scale features of size 2L as follows, $[m_1, n_1], [n_1, m_1], \ldots, [m_p, n_p], [n_p, m_p]$. The vectors are formed as input vector x to the Multi-Task learning model.

At step S206, it uses the following method to group the input data points into different clusters automatically. To be specific, the principle of GP clustering is based on the key observation that the variances of predictive values are smaller in dense areas and larger in sparse areas. The variances can be employed as a good estimate of the support of a probability density function, where each separate support domain can be considered as a cluster. This observation can be explained from the variance function of any predictive data point) $x_*$.

$$\sigma^2(x_*)=K_{**}-K_*\tilde{K}^{-1}K_*^T. \quad (12)$$

If $x_*$ is in a sparse region, then $K_*\tilde{K}^{-1}K_*^T$ becomes small, which leads to large variance $\sigma^2(x_*)$, and vice versa. Another good property of Equation (12) is that it does not depend on the labels, which means it can be applied to the unlabeled data.

To perform clustering, the following dynamic system associated with Equation (12) can be written as $$F(x)=-\nabla \sigma^2(x). \quad (13)$$

The existing theorem can guarantee that almost all the trajectories approach one of the stable equilibrium points detected from Equation (13). After each data point finds its corresponding stable equilibrium point, we can employ a complete graph to assign cluster labels to data points with the stable equilibrium points. Obviously, the variance function in Equation (12) completely determines the performance of clustering.

Suppose that we finally obtain C clusters. The centers of these clusters are denoted by $\{c_i\}_{i=1}^C$, the variances of these clusters by $\{\Sigma_i^2\}_{i=1}^C$, and their weights by $\{w_i\}_{i=1}^C$ where $w_i$ is the ratio of the number of data points from the i-th cluster to the number of all data points. All of the above variables can be computed.

Then we refer to each $c_i$ as the input of Equation (11), and we can obtain its corresponding probability $p_i$ and variance $\sigma_i^2$.

For any un-seen pair of face images, it is to first compute its joint feature vector $x_*$ for each pair of patches as shown in FIG. 5B. Then its first-order and second-order statistics to the centers will be we computed. The statistics and variance of $x_*$ are represented as its high-dimensional facial features, denoted by $$\hat{x}_* = [\Delta_1^1, \Delta_1^2, \Delta_1^3, \Delta_1^4, \ldots, \Delta_C^1, \Delta_C^2, \Delta_C^3, \Delta_C^4]^T,$$

$$\text{where } \Delta_i^1 = w_i\left(\frac{x_* - c_i}{\Sigma_i}\right), \Delta_i^2 = w_i\left(\frac{x_* - c_i}{\Sigma_i}\right), \Delta_i^3 = p_i, \text{ and } \Delta_i^4 = \sigma_i^2.$$

And then, all of the new high-dimensional features from each pair of patches are concatenated to form the final new high-dimensional feature for the pair of face images, so as to determine whether the first and the second multiple scale features are from the same individual, for example by using the linear Support Vector Machine (SVM).

In the MTL-DGPLVM model, it needs to invert the large matrix when doing inference and prediction. For large problems, both storing the matrix and solving the associated linear systems are computationally prohibitive. In one embodiment of this application, the well-known anchor graphs method may be used to speed up this process. To put it simply, the present application first selects $q$ ($q=n$) anchors to cover a cloud of $n$ data points, and forms an $n \times q$ matrix $Q$, where $Q_{i,j} = k_\theta(x_i, x_j)$. $x_i$ and $x_j$ are from $n$ training data points and $q$ anchors, respectively. Then the original kernel matrix $K$ can be approximated as $K = QQ^T$. Using the matrix inversion lemma, computing the $n \times n$ matrix $QQ^T$ can be transformed into computing the $q \times q$ matrix $Q^TQ$, which is more efficient.

Speedup on Inference

When optimizing the proposed model of the present application, it needs to invert two large matrices $(K^{-1}+W)$ and $(\lambda I_n + AKA)$. Using the well-known Woodbury identity, it can deduce the following equation $$(K^{-1}+W)^{-1} = K - KW^{1/2}B^{-1}W^{1/2}K \tag{14}$$

where $W$ is a diagonal matrix and $B = I_n - W^{1/2}KW^{1/2}$.

During inference, it takes $q$ k-means clustering centers as anchors to form $Q$. Substituting $K = QQ^T$ into $B$, it gets $$B^{-1} = I_n - W^{1/2}Q(I_q + Q^TWQ)^{-1}Q^TW^{1/2} \tag{15}$$

where $(I_q + Q^TWQ)$ is a $q \times q$ matrix.

Similarly, it can get $$(\lambda I_n + AKA)^{-1} = (\lambda I_n + AQQ^TA)^{-1} = \lambda^{-1}I_n - \lambda^{-1}AQ(\lambda I_q + Q^TAAQ)^{-1}Q^TA. \tag{16}$$

Speedup on Prediction

When computing the predictive variance $\sigma(x_*)$, it needs to invert the matrix $(K+W^{-1})$. At this time, the Gaussian Processes for Clustering as discussed in the above may be used to calculate the accurate clustering centers that can be regarded as the anchors. Using the Woodbury identity again, it obtains $$(K+W^{-1})^{-1} = W - WQ(I_q + Q^TWQ)^{-1}Q^TW \tag{17}$$

where $(I_{2q} + Q^TWQ)$ is only a $q \times q$ matrix, and its inverse matrix can be computed more efficiently.

Although the preferred examples of the present disclosure have been described, those skilled in the art can make variations or modifications to these examples upon knowing the basic inventive concept. The appended claims is intended to be considered as comprising the preferred examples and all the variations or modifications fell into the scope of the present disclosure.

Obviously, those skilled in the art can make variations or modifications to the present disclosure without departing the spirit and scope of the present disclosure. As such, if these variations or modifications belong to the scope of the claims and equivalent technique, they may also fall into the scope of the present disclosure.

What is claimed is:

1. An apparatus for generating a Discriminative Multi-Task Gaussian Process (DMTGP) model and using the DMTGP model as a binary classifier in facial recognition, the apparatus comprising:
   at least one processor,
   a memory configured to store computer program instructions that, when executed by the at least one processor, cause the at least one processor to be configured to:
   generate the DMTGP model by:
   retrieving a plurality of source-domain datasets $X_i$ from a first database and a target-domain dataset $X_t$ from a second database different from the first database;
   determining a latent subspace $Z_t$ matching with the target-domain dataset $X_t$ best and a posterior distribution P for the determined latent subspace $Z_t$ from the target-domain dataset $X_t$ and the source-domain datasets $X_i$;
   determining information M shared between the target-domain data $X_t$ and the source-domain datasets $X_i$; and
   establishing a multi-task learning model $L_{model}$ from the posterior distribution P, the shared information M on the target-domain dataset $X_t$ and the source-domain datasets $X_i$, the multi-task learning model $L_{model}$ being based on Gaussian processes that comprise hyper-parameters, and the hyper-parameters being learned from data automatically without using model selection methods;
   obtain a pair of images to be compared by the DMTGP model to determine whether the pair of images correspond to a same person or correspond to different people, a first one of the images corresponding to a first face A and a second one of the images corresponding to a second face B, a first plurality of multiple scale features $m_1, m_2, \ldots m_p$ being extracted from the first face A, and a second plurality of multiple scale features $n_1, n_2, \ldots n_p$ being extracted from the second face B in different landmarks of the first face A and the second face B;
   determine similarities $S_1, S_2, \ldots S_p$ of each two features in same landmarks, $S_1$ referring to a similarity of $m_1$ and $n_1$, $S_2$ referring to a similarity of $m_2$ and $n_2, \ldots$, and $S_p$ referring to a similarity of $m_p$ and $n_p$;
   feed the similarities $S_1, S_2, \ldots S_p$ to the DMTGP model to determine whether the first face A matches the second face B by applying the multi-task learning model $L_{model}$ to the similarities $S_1, S_2, \ldots S_p$ to determine whether the first face A matches the second face B; and
   verify that the first face A matches the second face B according to a facial recognition result from the DMTGP model.

2. The apparatus of claim 1, wherein the posterior distribution P is determined using the following rule: given hyper-parameters $\theta$ to be determined for concreting form of the multi-task learning model $L_{model}$, for a data x of the source-domain datasets $X_i$, latent subspace and the hyper-parameters $\theta$ shall match with the data x best.

3. The apparatus of claim 1, wherein the shared information M is determined by extending a mutual entropy to the posterior distributions P.

4. The apparatus of claim 1, wherein the multi-task learning model $L_{model}$ is established by maximizing the posterior distributions P and the shared information M.

5. The apparatus of claim 4, wherein the computer program instructions executed by the at least one processor further cause the at least one processor to be configured to determine all parameters for the multi-task learning model $L_{model}$ by:
  initializing hyper-parameters $\theta^0$ randomly for $\theta$;
  applying a gradient descent process to the multi-task learning model $L_{model}$ to obtain $$\frac{\partial L_{model}}{\partial \theta};$$

and
  iterating $\theta$ by rule of $$\theta^t = \theta^{t-1} - \alpha \frac{\partial L_{model}}{\partial \theta}$$

to make $\theta$ to converge to optimal values.

6. The apparatus of claim 1, wherein the computer program instructions executed by the at least one processor further cause the at least one processor to be configured to input $S_1, S_2, \ldots S_p$ formed as input vector x to the multi-task learning model using the following rules: given any unseen test point $x_*$ of X formed of $S_1, S_2, \ldots S_p$, a probability of its latent function $f_*$ is $f_*|X,y,x_*:N(K_*K^{-1}\hat{f}, K_{**}-K_*K^{-1}K_*^T)$, K being a Kernel matrix and $\tilde{K}=K+W^{-1}$, $f_*$ being squashed to find a probability of class membership as follows: $\bar{\pi}(f_*)=\int \pi(f_*)p(f_*|X,y,x_*)df_*$, label $y_i=1$ when the first plurality of multiple scale features and the second plurality of multiple scale features of the face pair indicate whether the first face A matches the second face B, and label $y_i=|1$ when the first plurality of multiple scale features and the second plurality of multiple scale features of the face pair do not indicate whether the first face A matches the second face B.

7. The apparatus of claim 1, wherein the plurality of source-domain datasets $X_i$ comprise web images and YouTube® faces.

8. The apparatus of claim 1, wherein the plurality of source-domain datasets $X_i$ comprise web images, Multi-PIE, YouTube® faces, and LifePhotos.

9. The apparatus of claim 1, wherein the apparatus is a computer or a mobile device, and a user having the first face A is logged onto the computer or the mobile device when the processor indicates that the first face A matches the second face B.

10. The apparatus of claim 1, wherein the computer program instructions further cause the processor to be configured to improve computer vision capabilities of the apparatus using the multi-task learning model $L_{model}$, the multi-task learning model $L_{model}$ verifying facial data consistency, the first plurality of multiple scale features $m_1, m_2, \ldots m_p$ and the second plurality of multiple scale features $n_1, n_2, \ldots n_p$ being transformed to the similarities $S_1, S_2, \ldots S_p$, and computational costs being reduced by learning the hyper-parameters from the data automatically without using the model selection methods.

11. An apparatus for generating a Discriminative Multi-Task Gaussian Process (DMTGP) model and using the DMTGP model as a binary classifier in facial recognition, the apparatus comprising:
  at least one processor,
  a memory configured to store computer program instructions that, when executed by the at least one processor, cause the at least one processor to be configured to:
    generate the DMTGP model by:
      retrieving a plurality of source-domain datasets $X_i$ from a first database and a target-domain dataset $X_t$ from a second database different from the first database;
      determining a latent subspace $Z_t$ matching with the target-domain dataset $X_t$ best and a posterior distribution P for the determined latent subspace $Z_t$ from the target-domain dataset $X_t$ and the source-domain datasets $X_i$;
      determining information M shared between the target-domain data $X_t$ and the source-domain datasets $X_i$; and
      establishing a multi-task learning model $L_{model}$ from the posterior distribution P, the shared information M on the target-domain dataset $X_t$ and the source-domain datasets $X_i$, the multi-task learning model $L_{model}$ being based on Gaussian processes that comprise hyper-parameters, and the hyper-parameters being learned from data automatically without using model selection methods;
    obtain a pair of images to be compared by the DMTGP model to determine whether the pair of images correspond to a same person or correspond to different people, a first one of the images corresponding to a first face A and a second one of the images corresponding to a second face B, a first plurality of multiple scale features $m_1, m_2, \ldots m_p$, being extracted from the first face A, and a second plurality of multiple scale features $n_1, n_2, \ldots n_p$ being extracted from the second face B in different landmarks of the first face A and the second face B;
    concatenate each pair of multi-scale features and its flipped version to obtain $[m_1, n_1]$ and $[n_1, m_1]$ so as to generate 2P multi-scale features of size 2L $[m_1, n_1], [n_1, m_1], \ldots, [m_p, n_p], [n_p, m_p]$ as input vector x to the multi-task learning model $L_{model}$;
    feed similarities $S_1, S_2, \ldots S_p$ to the DMTGP model to determine whether the first face A matches the second face B by applying the multi-task learning model $L_{model}$ to the similarities $S_1, S_2, \ldots S_p$ to determine whether the first face A matches the second face B; and
    verify that the first face A matches the second face B according to a facial recognition result from the DMTGP model.

12. The apparatus of claim 11, wherein the computer program instructions executed by the at least one processor further cause the at least one processor to be configured to:
  group data points of the input vector x into C different clusters, centers of the clusters being denoted by $\{c_i\}_{i=1}^C$, variances of the clusters being denoted by $\{\Sigma_i^2\}_{i=1}^C$, weights of the clusters being denoted by $\{w_i\}_{i=1}^C$, and $w_i$ being a ratio of a number of data points from an i-th cluster to a number of all data points;
  determine a corresponding probability $p_i$ and a variance $\sigma_i^2$ for each $c_i$;
  compute, for any unseen pair of face images, a joint feature vector $x_*$ for pairs of patches;

compute a first-order statistic and a second-order statistic to the centers, statistics and variance of $x_*$ being represented as its high-dimensional facial features, denoted by $$\hat{x}_* = [\Delta_1^1, \Delta_1^2, \Delta_1^3, \Delta_1^4, \ldots, \Delta_C^1, \Delta_C^2, \Delta_C^3, \Delta_C^4]^T,$$

and wherein $\Delta_i^1 = w_i\left(\frac{x_* - c_i}{\Sigma_i}\right)$, $\Delta_i^2 = w_i\left(\frac{x_* - c_i}{\Sigma_i}\right)$, $\Delta_i^3 = p_i$, and $\Delta_i^4 = \sigma_i^2$;

and
concatenate the high-dimensional facial features from each of the pairs of patches to form final new high-dimensional facial features for the unseen pair of face images to determine whether the first plurality of multiple scale features and the second plurality of multiple scale features indicate whether the first face A matches the second face B.

13. The apparatus of claim 11, wherein the posterior distribution P is determined using the following rule: given hyper-parameters $\theta$ to be determined for concreting form of the multi-task learning model $L_{model}$, for a data x of the source-domain datasets X, latent subspace and the hyper-parameters $\theta$ shall match with the data x best.

14. The apparatus of claim 11, wherein the shared information M is determined by extending a mutual entropy to the posterior distributions P.

15. The apparatus of claim 11, wherein the multi-task learning model $L_{model}$ is established by maximizing the posterior distributions P and the shared information M.

16. The apparatus of claim 15, wherein the computer program instructions executed by the at least one processor further cause the at least one processor to be configured to determine all parameters for the multi-task learning model $L_{model}$ by:
initializing hyper-parameters $\theta^0$ randomly for $\theta$;
applying a gradient descent process to the multi-task learning model $L_{model}$ to obtain $$\frac{\partial L_{model}}{\partial \theta};$$

and
iterating $\theta$ by rule of $$\theta^t = \theta^{t-1} - \alpha \frac{\partial L_{model}}{\partial \theta}$$

to make $\theta$ to converge to optimal values.

17. The apparatus of claim 11, wherein the plurality of source-domain datasets $X_i$ comprise web images and YouTube® faces.

18. The apparatus of claim 11, wherein the plurality of source-domain datasets $X_i$ comprise web images, Multi-PIE, YouTube® faces, and LifePhotos.

19. The apparatus of claim 11, wherein the apparatus is a computer or a mobile device, and a user having the first face A is logged onto the computer or the mobile device when the processor indicates that the first face A matches the second face B.

20. The apparatus of claim 11, wherein the computer program instructions further cause the processor to be configured to improve computer vision capabilities of the apparatus using the multi-task learning model $L_{model}$, the multi-task learning model $L_{model}$ verifying facial data consistency, and the first plurality of multiple scale features $m_1, m_2, \ldots m_p$ and the second plurality of multiple scale features $n_1, n_2, \ldots n_p$ being transformed to the similarities $S_1, S_2, \ldots S_p$, and computational costs being reduced by learning the hyper-parameters from the data automatically without using the model selection methods.

\* \* \* \* \*

UNITED STATES PATENT AND TRADEMARK OFFICE
CERTIFICATE OF CORRECTION

PATENT NO. : 10,339,177 B2
APPLICATION NO. : 15/278461
DATED : July 2, 2019
INVENTOR(S) : Xiaoou Tang and Chaochao Lu It is certified that error appears in the above-identified patent and that said Letters Patent is hereby corrected as shown below:

In the Claims

Claim 6, Column 13, Line 32: should read "$f_* \mid \mathbf{X}, \mathbf{y}, x_* : N(\mathbf{K}_* \mathbf{K}^{-1}\hat{\mathbf{f}}, \mathbf{K}_{**} - \mathbf{K}_* \widetilde{\mathbf{K}}^{-1} \mathbf{K}_*^T),$"

Claim 12, Column 15, Line 9: should read " and $\Delta_j^1 = w_j(\frac{\mathbf{x}_* - \mathbf{c}_j}{\Sigma_j})$, $\Delta_j^2 = w_j(\frac{\mathbf{x}_* - \mathbf{c}_j}{\Sigma_j})^2$, $\Delta_j^3 = p_j$, and $\Delta_j^4 = \sigma_j^2$;"

Claim 13, Column 15, Line 23: "source-domain datasets X, latent subspace and the hyper-" should read "source-domain datasets $X_i$, latent subspace and the hyper-"

Signed and Sealed this
Twenty-seventh Day of August, 2019

Andrei Iancu
*Director of the United States Patent and Trademark Office*